UNITED STATES PATENT OFFICE.

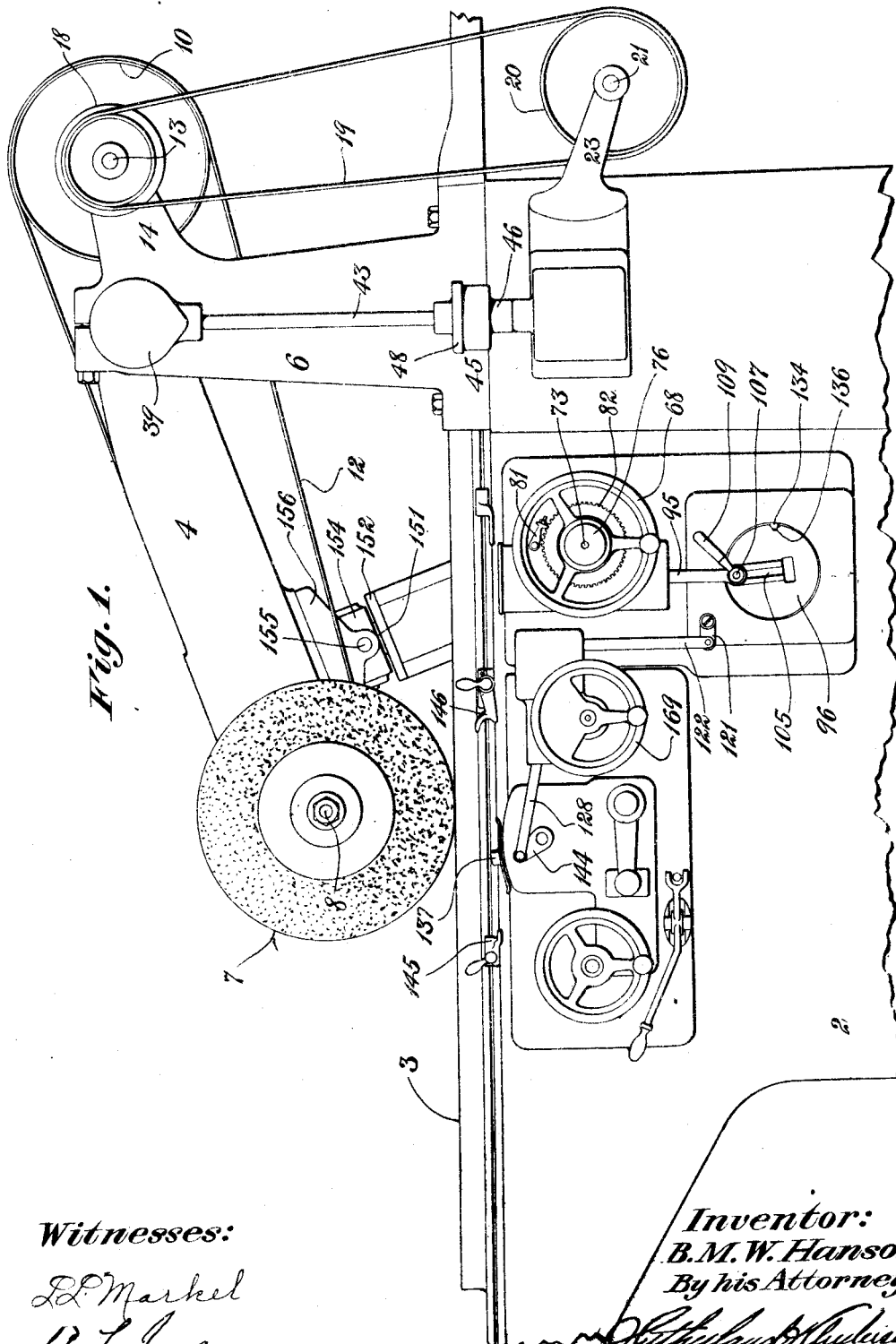

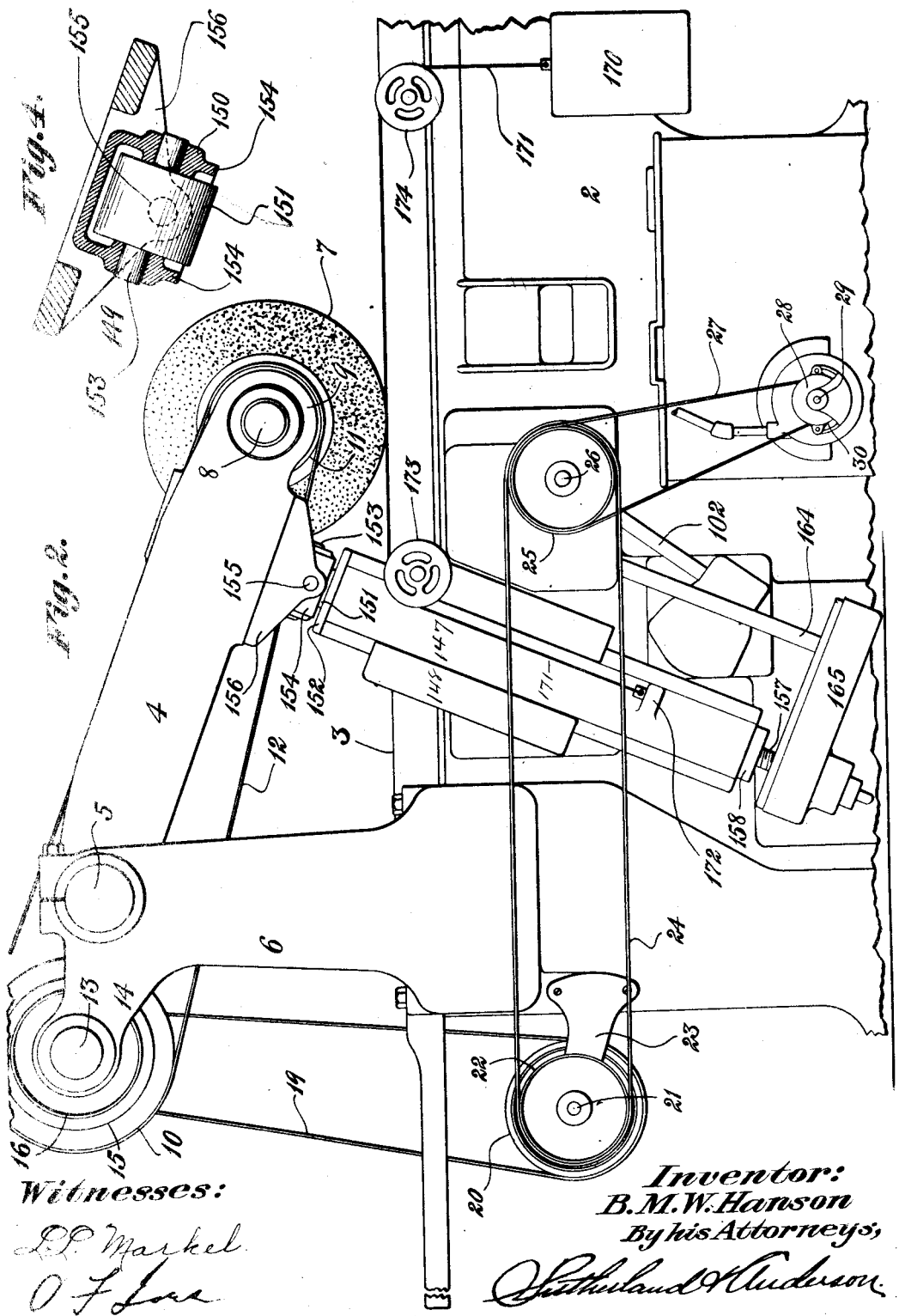

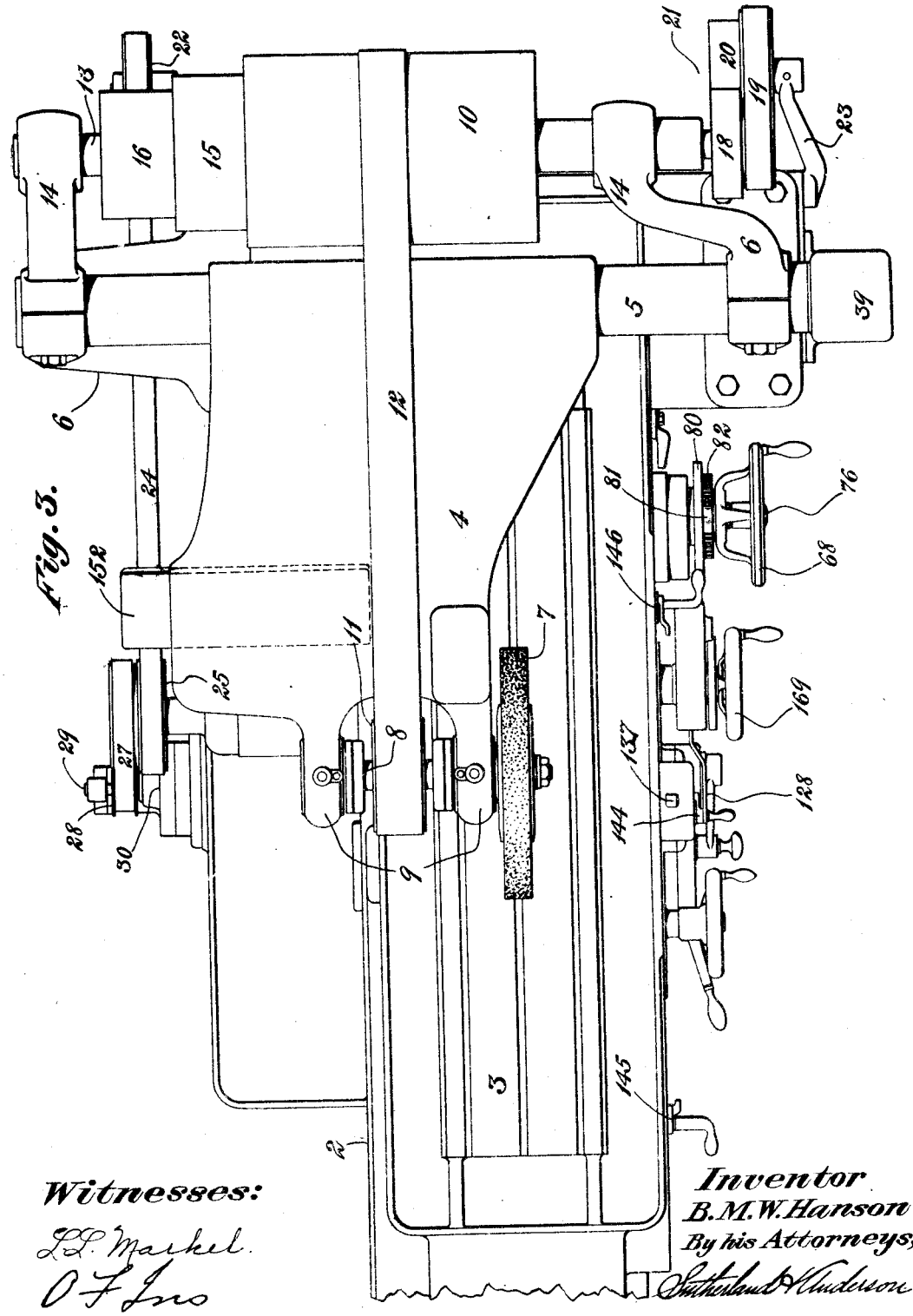

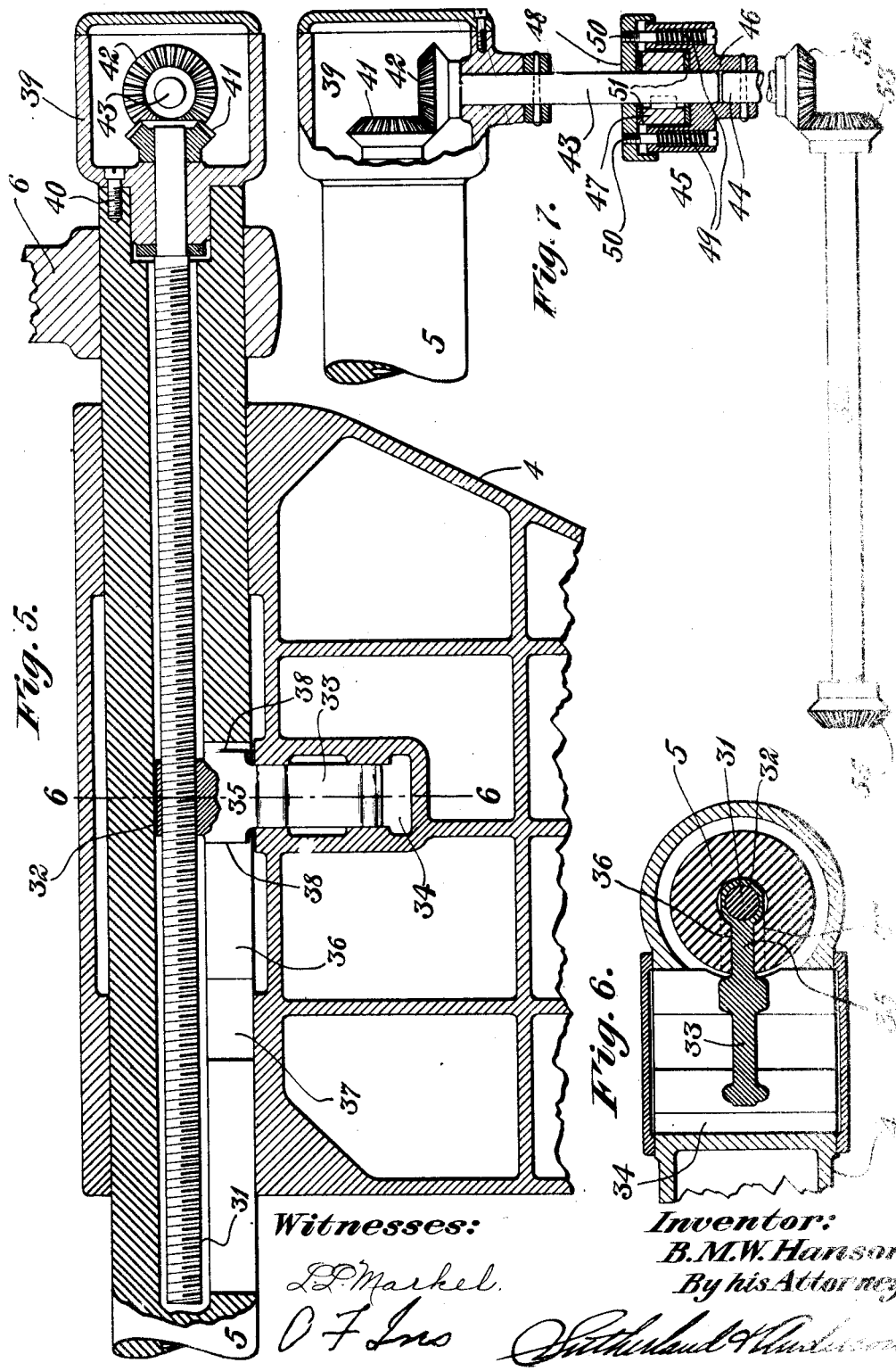

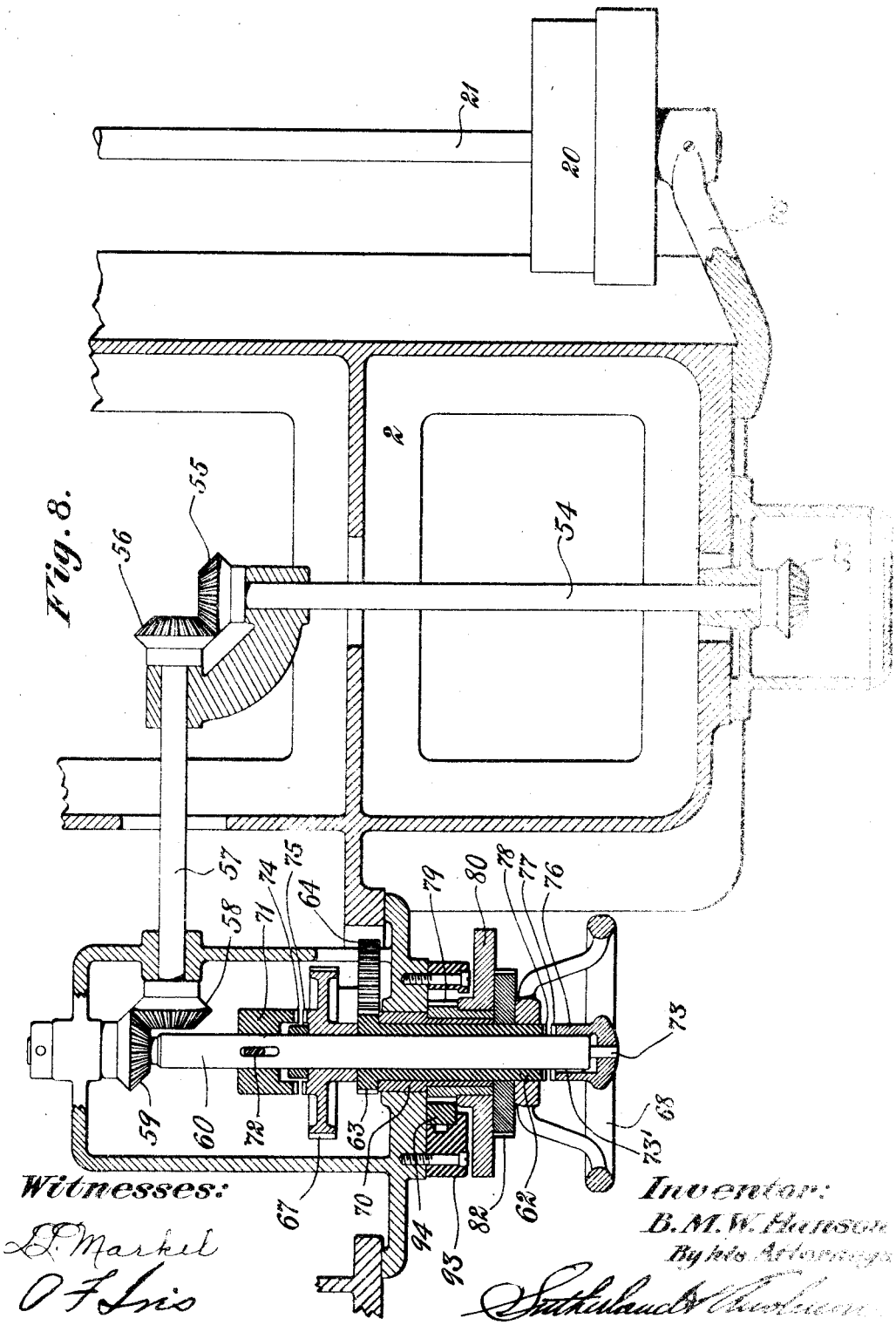

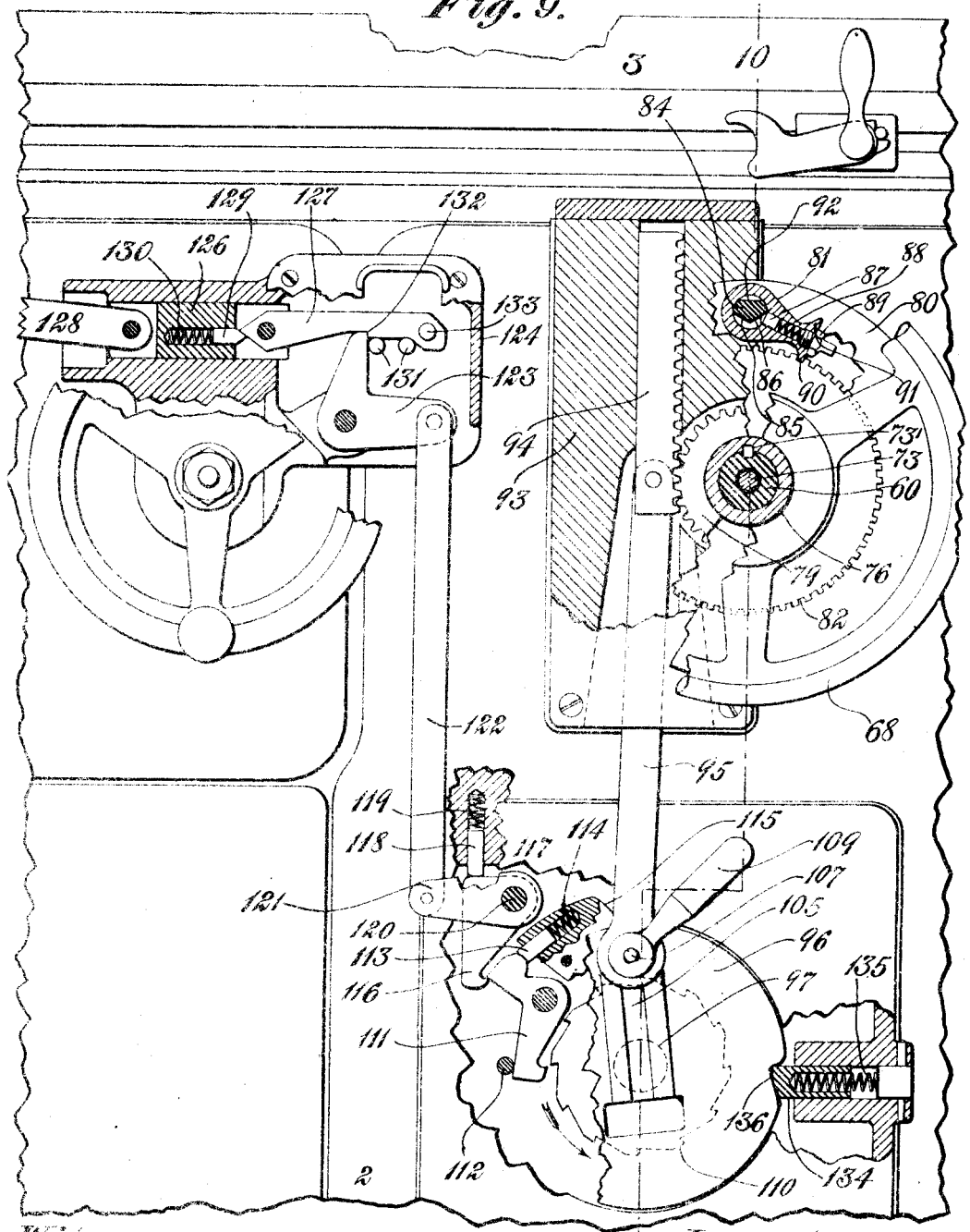

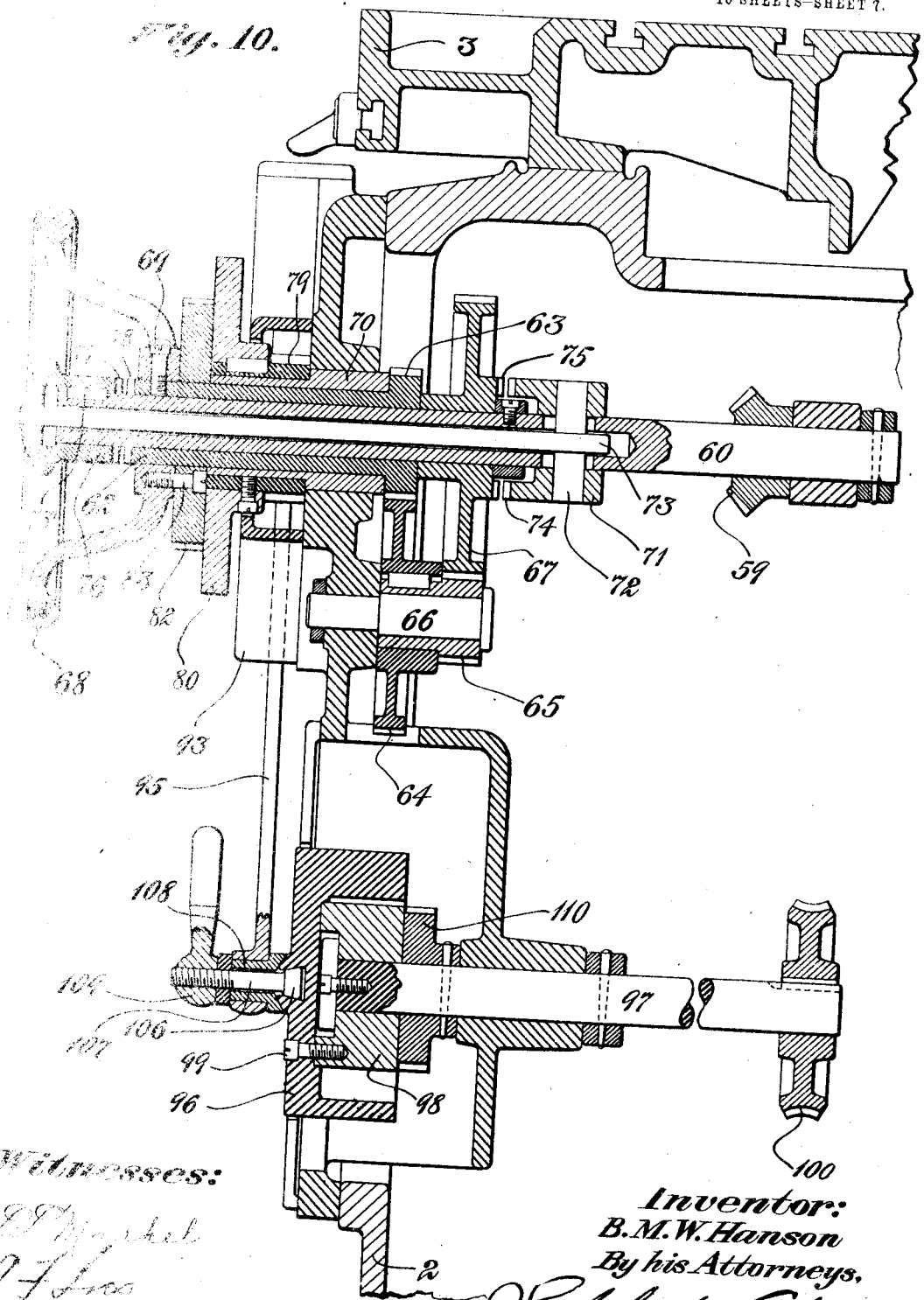

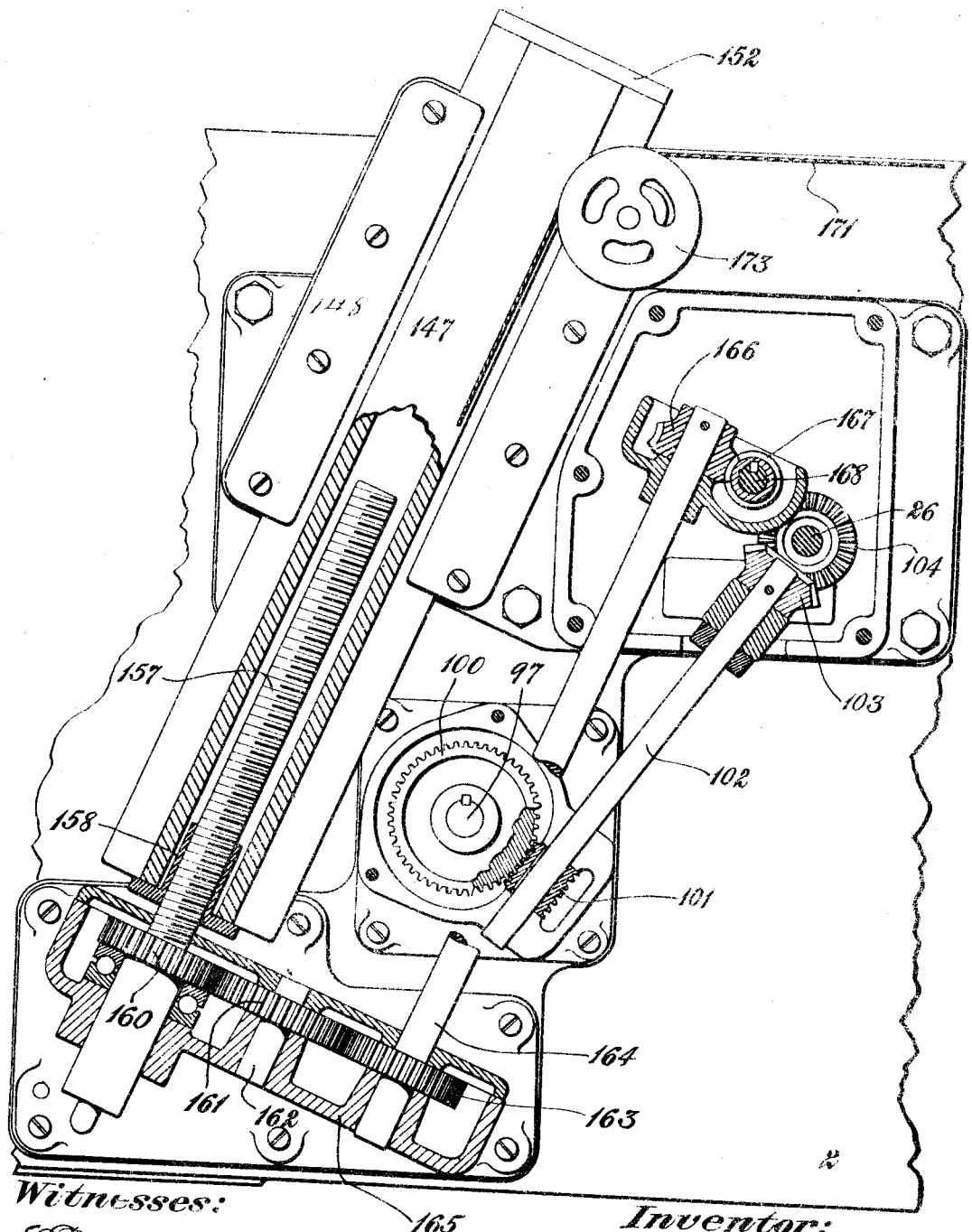

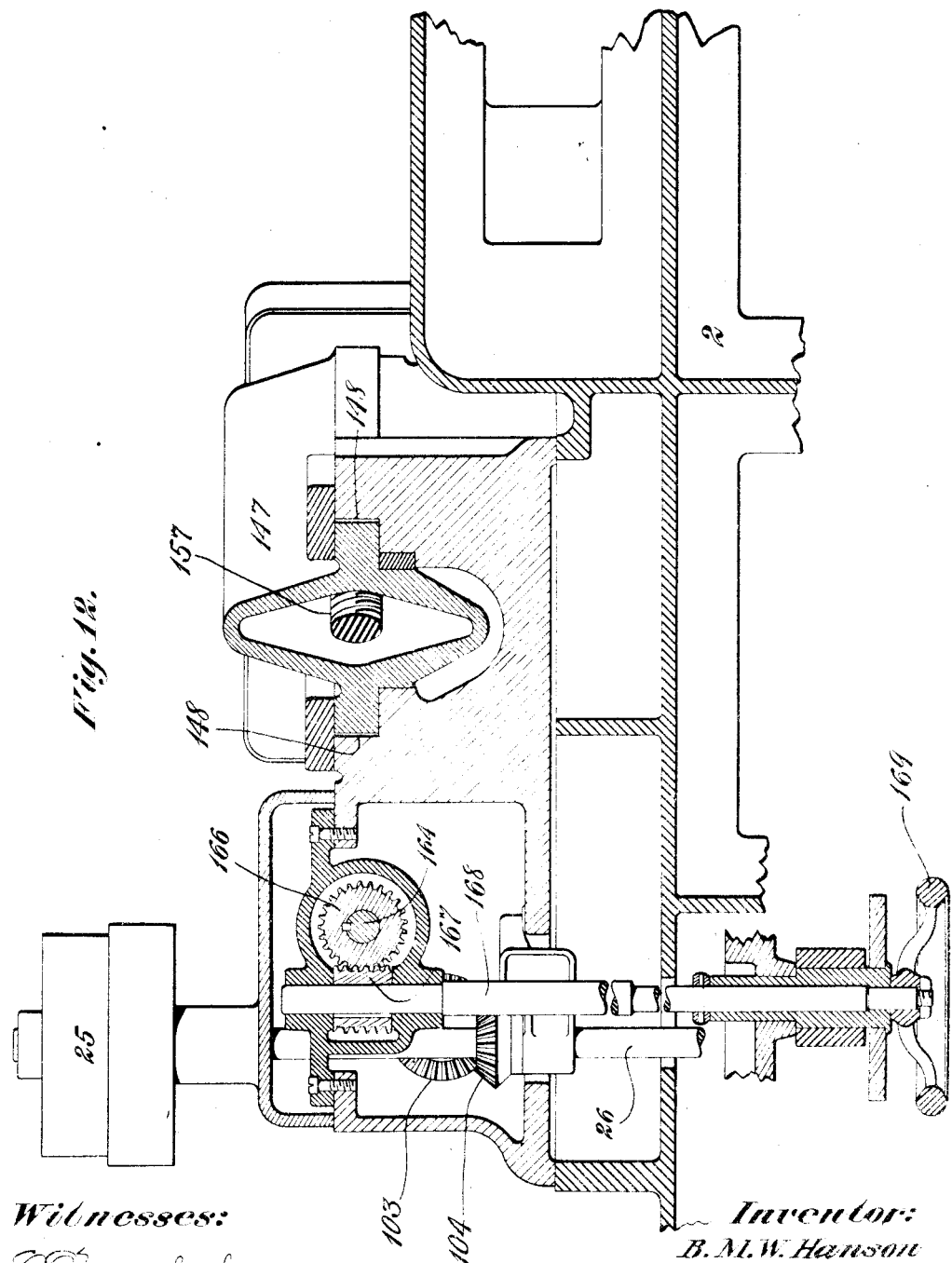

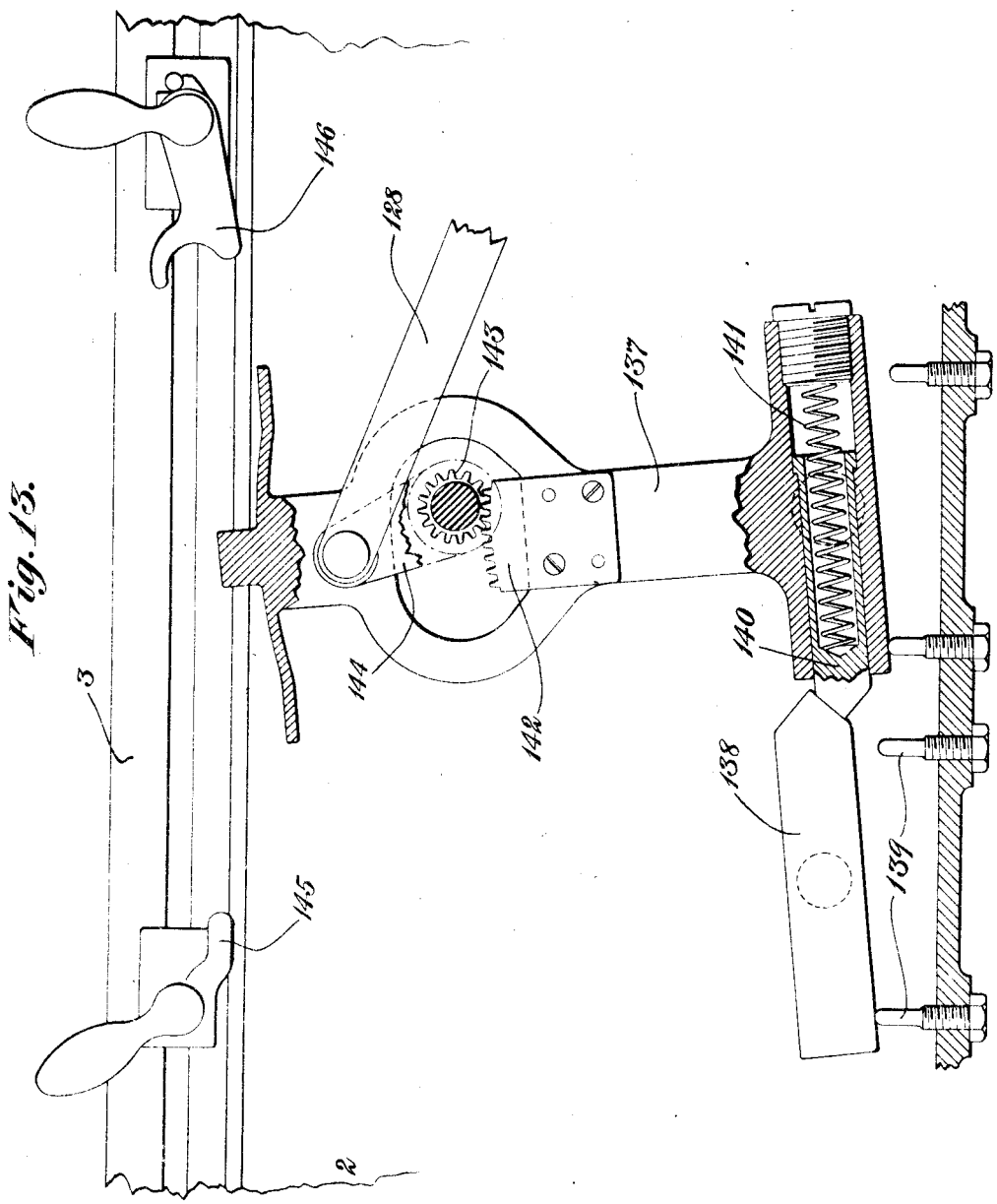

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

METAL-REDUCING MACHINE.

1,104,988.   Specification of Letters Patent.   Patented July 28, 1914.

Application filed May 26, 1913.   Serial No. 770,006.

*To all whom it may concern:*

Be it known that I, BENGT M. W. HANSON, a citizen of the United States, residing at Hartford, in the county of Hartford and State of Connecticut, have invented certain new and useful Improvements in Metal-Reducing Machines, of which the following is a specification.

This invention relates to metal-reducing machines, among the principal objects of the invention being the provision of a machine of this character by which articles of various kinds can be quickly and accurately reduced.

In the drawings accompanying and forming part of the present specification there is shown in detail one of the several convenient forms of embodiment of the invention, which to enable those skilled in the art to practise the same will be set forth in the following description. The invention is not restricted to such showing; departures in several respects therefrom can be made within the scope of the invention defined by the claims following said description.

Referring to said drawings:

Figure 1 is a front elevation of a metal-reducing machine involving the invention. Fig. 2 is a rear elevation of the machine only a portion thereof being illustrated. Fig. 3 is a top plan view of the machine. Fig. 4 is a sectional detail on the line 4—4 of Fig. 2. Fig. 5 is a horizontal section of a cross rail, tool carrier, and cross feeding mechanism for said tool carrier. Fig. 6 is a transverse section on the line 6—6 of Fig. 5. Fig. 7 is a sectional detail partly in elevation of a part of the operating means for the cross feeding mechanism. Fig. 8 is a horizontal sectional view with certain parts in plan of the remaining elements of the driving means for said cross feeding mechanism, together with certain of the coöperating parts hereinafter more particularly described. Fig. 9 is a front elevation partly in section of mechanism for obtaining an intermittent cross feed. Fig. 10 is a vertical section on the line 10—10 of Fig. 9, the parts being shown in different positions in the two views. Fig. 11 is an elevation partly in section of mechanism for effecting the adjustment of the tool-carrier to vary the depth of cut. Fig. 12 is a horizontal section of mechanism coöperative with the means illustrated in Fig. 11, for securing the adjustment of the tool-carrier to regulate the depth of cut. Fig. 13 is a view partly in section of mechanism for effecting through the action of the traveling work-carrier, the intermittent lateral feed movement of the tool-carrier.

Like characters refer to like parts throughout the several figures which are on different scales.

A metal-reducing machine involving the invention can be employed for various purposes for example for grinding areas or surfaces of different kinds. In this case the tool would preferably consist of a grinding wheel. In the machine there is a work-carrier and an oscillatory tool-carrier. The two carriers are preferably given a compound movement, consisting in the present case of two movements which have transverse directions; these movements may be considered as feed movements or motions provided to effect reduction of the stock. In addition to such compound movement or movements there is a third movement or an adjustment by which the amount or depth of cut can be regulated. The functions in question may be obtained in various ways. It is preferred that the feed movements as they have been considered, be accomplished in part by the work-carrier and the tool-carrier and that the adjustment movement be obtained through the tool carrier. For instance as will hereinafter appear the feed movements can be accomplished by the reciprocation of the work-carrier and the movement of the tool-carrier transversely of the line of movement of the work, while the adjustment to which allusion has been made can be obtained by the tool carrier.

With the foregoing general observations a full description will be given of what is shown in the drawings.

The different parts of the machine may be supported by any suitable framing. That shown comprises in its make-up the bed 2 having ways for supporting and guiding for reciprocation, the work-carrier 3 which as illustrated, consists of a reciprocatory platen that can be moved back and forth upon said bed by any suitable mechanism, for example such as that shown in Letters Patent No. 915,174 granted March 16, 1909.

The tool-carrier is denoted in a general way by 4 and as shown, consists of an arm supported at or near one terminal for oscillation, by the cross rail or stationary shaft 5 sustained at its ends by columns or standards as 6 rising from and suitably fastened to the base or bed 2 at the front and rear near one end thereof, said columns being fastened rigidly as by bolting or otherwise, to said bed.

The grinding-wheel is designated by 7 and it is fastened in some suitable way to the rotary shaft 8 supported between the extensions 9 constituting a fork at the inner end of the oscillatory carrier or arm 4, one end of the shaft 8 projecting beyond one of the extensions (Fig. 3) and the reducing or grinding wheel 7 being connected with this end of said shaft.

While any suitable means may be provided for rotating the reducing tool or grinding wheel 7 that shown and now to be described has been found highly advantageous. The driver for the grinding wheel 7 as shown, consists of a band or belt wheel 10 preferably as illustrated made in the form of a drum or sufficiently elongated to insure a proper driving relation between said driver 10 and the driven member 11, (connected by a belt or band as 12) at all times or during the entire amount of transverse movement of the tool-carrier or oscillatory arm 4. The driver 10 as represented, is fastened to the rotary shaft 13 which may be driven in any desirable manner; the means shown for this purpose, however, will be hereinafter described. Said shaft 13 is supported by bearings or brackets 14 extending outwardly from the columns 6.

In the construction shown the axis of oscillation of the tool-carrier 4 is between the centers of rotation of the driver or drum 10 and the reducing wheel 7 and also of the pulley 11 which in the construction shown, is concentric with the said reducing wheel 7. The driver or drum 10 may be operated in any suitable manner, for instance from an overhead cone (not shown) adapted to be connected by a belt or band therewith. For this purpose said driver or drum 10 is shown having steps 15 and 16 of different diameters, to interchangeably receive said belt driven from said overhead cone and by which the speed of the driver or drum 10 and therefore of the grinding wheel 7 can be varied.

In the organization illustrated the reducing-wheel 7 is continuously rotative, although this is not always material. Fastened to the shaft 13 is the pulley 18 connected by a belt 19 with the pulley 20 fastened to the shaft 21 in turn rigidly carrying the pulley 22, said shaft 21 being sustained for rotation by a bracket or bearing 23 attached in some suitable manner to the bed 2. The pulley 22 is shown connected by a belt 24 with the pulley 25 on the shaft 26. The belt 24 traverses one step of the pulley 25 the other step thereof receiving the belt 27 connected with the pulley 28 which in turn is fastened to the shaft 29 on the pump 30. The mechanism for reciprocating the platen or work-carrier 3 is coöperative with said shaft 26. As will be understood the platen 3 reciprocates longitudinally of the bed 2 and during both strokes thereof the grinding wheel 7, being rotated and in contact with the work, is reducing.

After a predetermined movement of the platen, for instance after the same has completed one complete reciprocation, the grinding wheel 7 is given a transverse movement, for example by moving the oscillatory carrier 4 sidewise on the cross rail or stationary shaft 5. While various means may be provided for this purpose, that illustrated and now to be described is quite satisfactory. Said cross-feed mechanism involves in its make-up a screw as 31 which as shown is rotary but immovable in the direction of its axis of rotation, said cross bill being made tubular or hollow for a portion at least of its length, to receive said feed screw (Fig. 5). The nut threaded onto said feed screw 31 is designated by 32, and it is so connected with the oscillatory carrier or arm 4 that while the latter may be properly fed transversely by the joint action of said feed screw and nut, said carrier can be freely oscillated for purposes of adjustment or otherwise, without affecting the relation of the feed-screw and its nut or without moving the nut, for if this were not so or some equivalent means within the scope of the invention utilized, the carrier would be moved laterally when swung on its center of oscillation. The nut 32 is shown provided with an arm feeding portion or projection 33, said arm 4 just forward of its center of motion, having a slot or chamber 34 to receive said actuating portion or projection 33, the side edges of the latter engaging the opposite walls of said slot or chamber 34. The neck 35 connects the actuating and body portions of the nut 32, the cross rail 5 on its inner side having an elongated slot 36 to receive this neck 35 which is flattened on its upper and lower surfaces to engage and slide against the flat walls of the longitudinal slot 36 and thereby prevent rotation of said nut 32. It will be clear, therefore, that the arm 4 can be freely swung on its center of motion without moving the nut 32, although when said nut is moved in either direction through the agency of the feed-screw 31, it causes movement of the arm 4 crosswise of the machine. The walls of the slot 36 may be notched as at 37 to provide for the introduction into the hollow of the cross rail 5, of the body of the nut 32, thus providing a simple means by which the nut and feed screw can be assembled. The said neck, guide or key portion 35 is widened for instance by providing it with lateral wings 38, to an extent sufficient to prevent it dropping into the notch 37 during the feed movement of the nut; in fact the width of the neck 35 is greater than the length of the notches 37.

The driving means for the feed screw 31 is of such character preferably that said feed screw is given a step by step or intermittent movement, in the present case being operated at the conclusion of each full reciprocation of the platen 3 so as to effect through the intermediate parts already described, a like action with respect to the grinding wheel 7. The means for thus operating the feed screw may be of any suitable nature. Those illustrated which meet the conditions required will now be set forth. The feed screw 31 extends into the boxing or casing 39 (Figs. 5 and 7) which is fastened to the cross rail or stationary shaft in some suitable manner as by one or more screws 40, and it has a bevel gear 41 in mesh with a bevel gear 42 fastened to the shaft 43 also extending into said casing or boxing 39. The shaft 44 has its axis coincident with that of the shaft 43. As a matter of fact the two parts 43 and 44 might be considered as a sectional shaft.

Between the shafts 43 and 44 there is preferably a device which permits slip or relative motion of the two shafts 43 and 44 so that should the tool 7 strike an obstruction or should it be arrested in its lateral movement from any other cause, no injury will result to the machine owing to such connection. The frictional power transmitting member denoted in a general way by 45 answers suitably in this particular and now will be described. Fastened to the shaft 44 is the cup-like member 46 which incloses the collar 47 keyed or otherwise suitably fastened to the shaft 43, said cup-like member 46 which incloses the collar 47 keyed or otherwise suitably fastened to the shaft 43, being equipped with a cap 48, and the two parts being drawn together by springs 49 encircling the screws 50 projecting through the body of the cup-like member 46 and tapped into the cap 48 therefor, the springs bearing against the heads of the screws and also against the cup-like member 46. Between the collar 47 and the bottom of the cup-like member 46 and also between said collar and the cap 48 are washers 51 of leather or other suitable material. The construction just described presents a friction device whereby normally power will be transferred from the shaft 44 to the shaft 43 to effect the cross motion of the arm 4 through the intermediate parts. Fastened to the shaft 44 is the bevel gear 52 in mesh with the bevel gear 53 fixed to the shaft 54 having fastened to it the bevel gear 55 in mesh with the bevel gear 56 fixed to the shaft 57, the latter having fastened to it a second bevel gear 58 (Fig. 8) in mesh with the bevel gear 59 on the shaft 60 (Figs. 8 and 9) which shaft is intermittently operated in some suitable manner but which may also be operated by hand; that is to say the shaft 60 is either automatically or manually operable.

The shaft 60 extends through an opening in the bed 2 and is surrounded by the sleeve or hollow shaft 62 (Fig. 8) also extending through said opening. Rigid with said sleeve or shaft 62 is the pinion 63 in mesh with the spur gear 64 keyed to the elongated hub of the pinion 65 supported by a stub shaft or pivot 66 within the bed 2, said pinion 65 in turn meshing with the spur gear 67 loose on the shaft 60. The pinion 63 is situated at one end of said sleeve or hollow shaft 62. Fastened to the other end of said hollow shaft 62 exteriorly of the bed 2 is the hand-wheel 68, the two parts being connected by one or more screws 69. This shaft 62 is adapted for alternate automatic and manual operations and rotates in the bushing 70 driven or otherwise closely fitted in said opening 61. Pinned or otherwise connected with the shaft 60 for rotation therewith is the clutch-member 71, the pin 72 being shown for such purpose and extending through an elongated slot in said shaft 60 to thereby permit sliding movement of said clutch member on said shaft 60. Connected with said pin 72 is the operating rod 73 by which said clutch-member can be moved out or in, said clutch member having teeth 74 to coöperate with teeth 75 on the adjacent surface of the hub of the spur gear 67. Rigidly connected with the outer end of the operating rod 73 and keyed as by a key 73' to the shaft 60 is the clutch-member 76 made in the form of a knob slidable on the shaft 60 and provided with teeth 77 to coöperate with teeth 78 on the adjacent end of the hollow shaft 62. In Fig. 10 both clutch members 71 and 76 are shown as occupying their ineffective positions. It will be assumed that it is desired to effect the automatic movement of the shaft 60. In this event the clutch-member or knob 76 is pulled out, thus moving the rod 73 and the clutch member 71 in a corresponding direction and carrying the teeth 74 into mesh with the teeth 75, so that when the shaft 62 is rotated, the shaft 60 through the intermediate connections already described, will be rotated in unison therewith to effect through the intermediate parts also already described, the transverse movement of the tool carrier or arm 4. By moving the clutch-member 76 into engagement with the shaft 62 and simultaneously moving the clutch member 71 into its inoperative relation, the power feed will be disconnected from the shaft 60 so that when the wheel 68 is manually rotated it can, being then clutched to the shaft 60, effect the lateral adjustment of the arm, by reason of the described connections between said shaft 60 and said bushing.

The outer reduced portion of the bushing 70 loosely carries the pinion 79 which as will hereinafter appear, is intermittently oscillated, and keyed to the hub of said pinion 79 is the disk 80, presenting a suitable support or carrier for a pawl 81 which is preferably double acting in type and the two teeth of which (hereinafter described) are coöperative with a ratchet wheel 82 (Figs. 9 and 10) on the hollow shaft 62, said disk 80 being shown connected as by one or more screws 83, with the hand wheel 68. It will be clear that when the ratchet-wheel 82 is operated, the hand-wheel 68 and shaft 62 will be also operated, so that if said shaft 62 be clutched to the shaft 60, the tool-carrier or arm 4 will be moved crosswise of the bed 2, the amount of crosswise movement depending upon the amount of movement of the ratchet-wheel 82 or equivalent part. This ratchet-wheel can be rotated in either direction owing to the fact that the pawl 81 is reversibly mounted to effect the transverse movement of said tool carrier or arm 4 in either direction. For instance after the said tool-carrier has completed its movement from the front to the rear of the machine, the return movement of said tool carrier can be accomplished by shifting the pawl 81 as will hereinafter more particularly appear.

Upon the disk 80 is a stud or pivot 84 extending through a circular opening in the pawl 81 and having the converging faces 85 and 86 engageable alternately by a plunger 87 constantly advanced by a spring 88, said plunger 87 and spring 88 being fitted in a bore in the pawl, closed by the screw 89. The pawl has at its free end the teeth 90 and 91, the tooth 90 being shown in engagement with the ratchet wheel 82. By swinging the pawl around on its pivot 84, the tooth 91 can be positioned to engage the teeth of said ratchet wheel 82 to thus reverse the movement of said ratchet wheel. The plunger 87 bearing against the face 86 yieldingly maintains the tooth 90 in engagement with the teeth of the ratchet wheel 82, while when the pawl is swung over so that the tooth 91 can engage the teeth of the ratchet wheel 82, the plunger 87 will engage the angular stop face 85 so as to also yieldingly cause the pawl to engage the ratchet wheel. The pivot or stud 84 may as shown be provided with a flat face 92 to be engaged by the plunger 87 when it is desired to hold the pawl 81 in an ineffective or non-engaging position for example at such time as the shaft 60 is being operated through the primary agency of the hand-wheel 68 to effect manual transverse adjustments of the tool-carrier or swinging arm 4.

Fastened to the front of the bed is a boxing 93 which incloses the pinion 79 (Figs. 9 and 10) and which also has a guideway for the rack bar 94, the teeth of which mesh with said pinion 79. As will hereinafter appear this rack bar 94 is intermittently reciprocated, it being shown in Fig. 9 as being at the upper end of its movement. It will be supposed that said rack bar is drawn down. On the downward or advancing movement of the rack bar the pinion 79 is rotated, the disk 80 being given a movement of a corresponding extent, carrying the pawl 81 therewith and causing the tooth 90 to ride idly over the teeth of the ratchet wheel 82, said tooth 90 and the companion tooth 91 being beveled for such purpose. On the upward movement of the rack bar 94 the pinion 79 is oppositely moved thereby and motions of similar degree follow with respect to the disk 80 and the pawl 81, the pawl during this particular period being effective to feed the ratchet wheel 82 to effect as already described a similar motion of the shaft 62, the shaft 60 and cross motion of the arm 4 through the described connections.

There is shown pivoted to the rack bar 94 the link 95 (Figs. 9 and 10) having an adjustable connection with the wheel or disk 96 loose on the shaft 97. By reason of the adjustable connection between the link 95 and the disk 96, the degree of movement of the rack bar 94 and parts connected therewith including the arm 4, can be regulated. In other words this is one of the several ways which can be provided for adjusting the amount of intermittent transverse movement of the arm 4. Within the hollow wheel 96 is the collar 98, the two being fastened together in any suitable manner as by one or more screws 99, the collar in fact constituting a part of the wheel 96 and being directly yet loosely supported by the shaft 97 which is preferably continuously rotative. Said shaft 97 is shown provided with a worm-gear 100 (Figs. 10 and 11) engageable by the worm 101 fastened in some suitable manner to the shaft 102 disposed as shown at an angle. To said shaft 102 is also fastened the bevel gear 103 in mesh with the bevel gear 104 on the shaft 26 (Fig. 12). The wheel 96 is intermittently connected with the shaft 97 and is given on each of said intermittent movements one full rotation so as to effect through the parts already described one complete reciprocation of the rack bar 94. The means shown for accomplishing this particular function will be hereinafter described. The wheel 96 has in its outer face (Figs. 9 and 10) a radial slot 105 crossing the center thereof and which receives the wedge-like head 106 of the screw 107, said head engaging the outwardly converging side walls of said slot 105. The screw 107 extends freely through a bushing 108 which in turn projects through an opening in the hub at the lower end of the link 95, the threaded portion of the screw 107 receiving the lever nut 109. By loosening the nut 109, the screw 107 and bushing 108 which latter presents a pivot for the link 95, can be adjusted toward and from the axis of rotation of the wheel 96 to thereby regulate the amount of movement of the link 95 and hence of the parts connected therewith. If the screw 107 has its axis coincident with the center of motion of the wheel 96 the link 95 will not be reciprocated even though the wheel 96 be in motion.

Fastened as by pinning or otherwise to the shaft 97 is the ratchet wheel 110 (Figs. 9 and 10) coöperative with the pawl 111 approximately of elbow form pivoted to the wheel 96. In Fig. 9 the tooth of the pawl 111 is out of the path of the teeth of the ratchet wheel 110, the direction of rotation of which is indicated by the arrow in said Fig. 9. By causing the pawl to engage the teeth of the ratchet wheel 110 said ratchet wheel will carry the wheel 96 around therewith, the mechanism between the two parts consisting of what is known as a "one-revolution" clutch. In fact this is one of several types of this device which can be used in the connection noted. After the wheel 96 has made one complete revolution the pawl 111 is automatically tripped so as to disconnect the wheel 96 from the ratchet wheel 110. One arm of the pawl 111 engages against the stop 112 (Fig. 9) on the wheel 96, the other arm being operable by the spring plunger 113 which with its advancing spring 114 is seated in a bore in the extension 115 of the wheel 96; the spring plunger exerting a constant tendency to move the tooth of the pawl 111 into engagement with the ratchet wheel 110, this action, however, being resisted in some suitable way as by the latch 116, said latch and the pawl and ratchet mechanism just described being inclosed in a casing 117 on the bed 2. The latch 116 is maintained in its operative relation by the spring-plunger 118 which with its spring 119 is disposed in a bore in said boxing or casing 117. The latch 116 is fastened to the stud 120 pivotally mounted in the boxing or casing 117 and fastened in turn to said pivot or pin 120 is the arm 121 to which is jointed the link 122 similarly connected to one arm of the angle lever 123 pivotally mounted at its elbow in the box 124 on the bed 2.

Associated with the angle lever 123 is actuating or tripping mechanism for the latch 116 which in turn is governed by the reciprocatory platen 3 as will hereinafter appear. The boxing 124 is shown as slotted to receive for reciprocation, the actuating member or block 126 slotted at one end to pivotally receive the trip-member 127 and at the other to similarly receive the link 128, the function of which latter will be hereinafter explained. The body of the reciprocatory block 126 has a bore to receive the spring plunger 129 constantly advanced by the spring 130 disposed in said bore, said plunger being beveled at its operative end to coöperate with the correspondingly beveled portion of the trip member 127, the long branch of which normally rests on pins or studs 131 in the boxing 124. Said trip member 127 in proximity to the stop pins 131, has a catch portion or shoulder 132 to normally engage the upper branch of the angle lever 123, this relation being maintained by the upper inclined face of the spring plunger 129 engaging the lower inclined face of the trip member 127. When it is desired to throw the trip member out of action it can be swung up on its pivot to cause the lower inclined face of the plunger 129 to engage the upper inclined face of the trip member and to facilitate such operation of said trip member 127 the latter near its free end may be furnished with a pin 133. In Fig. 9 the block 126 is shown as being at the end of its backward movement. On each intermittent operation of this block 127 it is moved or advanced first toward the left in Fig. 9 and then to the position in which it is shown as occupying in said view. As said block is thus advanced it so swings the angle lever 123 as to raise the rod 122 and thereby through the described parts disengage the latch 116 from the pawl 11. The instant this occurs the ratchet wheel 110 is clutched to the wheel 96 through the intervention of said pawl, to rotate said wheel 96 in the manner already described. The reciprocation of the block 126 is quite a rapid one, and it is accomplished before the wheel 96 makes its full turn, so that before said full turn of said wheel 96 has been made the latch 116 will be in position to disengage the pawl 11 from the ratchet-wheel 110, this particular action being concluded at the moment the wheel 96 has made one full rotation. To prevent overthrow of said wheel 96 the stop member 134 may be provided, said stop member consisting of a spring operated bolt, the spring of which is denoted by 135, the periphery of the wheel 96 having a notch 136 to coöperate with the bolt 134. The bolt 134 is shown as being in the notch 136 in Fig. 9 and when the wheel 96 is operated in the manner already described the bolt 134 will be caused to recede thereby compressing the spring 135, owing to the bevel engaging surfaces of the notch and bolt. When, however, the wheel 96 has completed its full rotation in the manner already described, the bolt 134 is instantly shot into said notch 136 by said spring 135. There may be instances where the bolt 134 or its equivalent may not be necessary, but the provision of the same insures accuracy and prevents overthrow.

Mounted in a boxing on the front of the machine (Figs. 1 and 13) is the rocker 137 coöperative with the detent 138 limited in its rocking motion by stops 139, the rocker 137 being bored to receive the spring plunger 140 advanceable by the spring 141. The plunger 140 and active end of the detent 138 have engaging beveled surfaces. The rocker 137 is provided with a toothed segment 142, the teeth of which are in mesh with the pinion 143 to the shaft of which is fastened the arm 144 to which the link 128 (Fig. 9) is pivoted. This rocker 137 coöperates with dogs 145 and 146 adjustably connected with the reciprocatory platen or work carrier 3. It will be seen that one beveled face of the spring plunger 140 is in engagement with one of the beveled faces of the active portion of the detent 138 and that the latter is against one of the stop pins 139 or that on the left in Fig. 13. It will be assumed that the platen 3 is traveling toward the right in Fig. 13. When the platen has nearly completed its movement in this direction, the dog 145 will strike the upper end of the rocker 137 but will not initially swing said rocker over causing merely at first the movement of the spring plunger 140 backward and the consequent compression of the spring 141, this action continuing until the beveled edge of the plunger 140 meets the crown of the active portion of the detent 138 at which point the beveled portion of the plunger is caused to ride down the beveled surface of the detent 138 swinging over said detent and at the same time causing the swing of the rocker 137. On the opposite movement of the platen 3 the operation of the rocker is repeated but reversed. On each motion of the rocker or arm 137 the arm 144 through its described connections with said rocker is swung, so that through the link 128 the block 126 will be reciprocated, the commencement of the reciprocation occurring practically at the conclusion of the stroke of the carriage or platen 3, so that as will be clear the tool 7 will be caused to move transversely at about the time the carriage or platen 3 has completed each of its movements.

It will be supposed that a piece, say of approximately rectangular work is clamped, chucked to or otherwise connected with the reciprocatory platen or carriage 3, that the grinding wheel 7 is in contact with the work at one corner, that the wheel 7 is being rotated and that the platen or carriage 3 is being advanced. As the carriage or platen advances and as the wheel 7 turns, the work is reduced to an extent agreeing with the width of the periphery of the wheel 7. On the completion of the advancing movement of the carriage or platen 3 the tool or wheel carrier 7 is automatically shifted laterally as already described, so that on the return or backward movement of the carriage or platen 3 the wheel 7 will reduce a second area next the first area, these actions following in regular sequence until the wheel 7 has reduced the entire surface of the work. At this point it is necessary to secure the advance of the tool-carrier 4 or its adjustment to deepen the cut. In the present case this is effected by manually-controlled means, although the same might very well be otherwise. After the advance or adjustment of the carrier or arm 4 has been effected, the tool 7 will be in position to again reduce the work but in the illustration given, it will be in the corner of the work opposite that at which it originally started. In the meantime the pawl 81 will have been swung around to effect intermittently the step by step lateral movement of the carrier 4 in a direction opposite that which it primarily followed.

The two feed movements as I have termed them are automatic, although this may not always be essential, while the adjustment or depth-of-cut movement, as it might be considered, is manually governed and may be accomplished through the agency of a movable support such as that denoted in a general way by 147 (Figs. 2 and 11) and which as shown consists of a slide disposed at an angle to the swinging carrier or arm 4, the bed 2 having ways 148 to receive and guide said movable support or slide 147 for oblique movement. Between the movable support 147 and the arm 4 is interposed an abutment which may be of any suitable type and which is carried by one of said members for instance and as shown by the arm 4. Said abutment is denoted in a general way by 149 (Fig. 4) and it comprises a frame as 150 and an anti-friction roller as 151, the anti-friction roller being adapted to travel upon the track 152 (Fig. 2) constituting the head of the movable support or slide 147, the length of said track 152 being equal to the extent of transverse movement of the carrier or arm 4, so that the anti-friction roller 151 will be in contact with said track during the entire transverse movement of said carrier or arm 4. The anti-friction roller 151 is rigid with a shaft 153, the journal portions of which are supported for rotation by the opposite cheeks or flanges 154 of the frame 150. Said frame 150 is provided in turn with trunnions 155 supported for rocking motion by the wings 156 in parallelism with each other and depending from the arm 4. It will be clear that the abutment between the movable support 147 and arm 4 is not only swiveled but is anti-friction in type, the axis of rotation of the roller 151 being transverse or approximately at right angles to the axis of oscillation of the frame or bracket 154. Owing also to the construction described there is a correct engaging relation between the arm 4, and its movable support 147 which is primarily secured through the swivel mounting of the frame 151. As a matter of fact it is not always essential that the anti-friction roller 151 be present, although the preferred type of abutment is swiveled in order to assure correct working engagement between the arm and its support throughout the various adjustments of the arm.

As already observed after the surface of the stock has been ground once the arm 4 is caused to advance or is adjusted which is accomplished in the present case through the movement primarily by hand, of the support or slide in a downward angular direction and any convenient means may be secured for obtaining this particular movement of the slide or its equivalent. Those illustrated and now to be described answer satisfactorily. The lower portion of the slide 147 is chambered to receive the feed screw 157 coöperative with the nut 158 rigid with the slide 147, the feed screw 157 as shown being immovable in the direction of its axis of rotation. It will be clear that when the feed screw 157 is rotated in the proper direction the slide 147 through the movement of the nut 158 is moved downward, the extent of movement being in correspondence with the depth of cut to be made, which the operator will determine. Fastened to the feed screw 157 is the gear 160 in mesh with the gear 161 on the shaft 162, said gear 161 in turn meshing with the gear 163 fast on the shaft 164, the bearing 165 fastened to the bed 2 being provided to sustain said two shafts and said feed screw. Fastened to the upper end of the shaft 164 is the worm 166 in mesh with the worm gear 167 fastened to the shaft 168 (Figs. 11 and 12) which shaft 168 is supported by bearings on the bed, and it is equipped at its outer end with a hand wheel 169 by turning which the shaft 168 can be rotated to effect through the intermediate parts the downward movement of the support 147 and hence corresponding movement of the carrier or arm 4 which follows by gravity, said support or slide 147. To counterbalance the support 147 the weight 170 may be provided, said weight being connected to one end of the band or rope 171, the opposite end of which is connected with the lug 172 on the support or slide 147, said band between its ends passing around guide sheaves 173 and 174 on the bed 2.

What is claimed is:

1. In a machine of the class described, the combination of a work carrier, an oscillatory tool carrier provided with a tool, and automatically operative mechanism for relatively operating the carriers to cause the tool to longitudinally traverse the work and for operating one of the carriers to cause the tool to move step by step crosswise of the work.

2. In a machine of the class described, the combination of a reciprocatory work carrier, an oscillatory tool carrier provided with a tool adapted to traverse the work on the reciprocation of the work carrier, and means for automatically moving the tool carrier transversely of the line of reciprocation of the work carrier and partly across the work at approximately the end of each stroke of the work carrier.

3. In a machine of the class described, the combination of a work carrier, an oscillatory tool carrier provided with a tool, and mechanism for relatively operating the carriers to cause the tool to longitudinally and step by step crosswise traverse the work.

4. In a machine of the class described, the combination of a reciprocatory work-carrier, an oscillatory tool-carrier provided with a tool adapted to longitudinally traverse the work on the reciprocation of said work carrier, and means governed by the work-carrier for causing transverse movement of the tool carrier at predetermined points.

5. In a machine of the class described, the combination of a reciprocatory work carrier, an oscillatory tool carrier provided with a tool adapted to longitudinally traverse the work on the reciprocation of the work carrier, mechanism for automatically reciprocating the work carrier and for moving the tool carrier in the direction of its axis of oscillation at predetermined points, said oscillatory tool carrier being automatically movable about its axis to secure reduction of the work, and a movable support for resisting the oscillatory movement of the tool carrier in the different lateral positions thereof.

6. In a machine of the class described, the combination of a reciprocatory work-carrier, an oscillatory tool-carrier provided with a reducing tool to longitudinally traverse the work on the reciprocation of the work carrier, and means for automatically causing a lateral movement of the tool-carrier approximately at the conclusion of each stroke of the work-carrier.

7. In a machine of the class described, the combination of a work-carrier, an oscillatory tool-carrier, a rotary driven member on said tool carrier, a rotary driving member for said driven member, supported independently of the tool-carrier, the axis of oscillation of the tool-carrier being between the centers of rotation of the driving and driven members, and a tool on the tool-carrier, operatively connected with said driven member.

8. In a machine of the class described, the combination of a work-carrier, an oscillatory, laterally movable tool-carrier, a pulley on said tool carrier, a drum supported independently of the tool-carrier, the axis of oscillation of said tool carrier being between the centers of rotation of the drum and the pulley, the length of the drum being equal approximately to the transverse movement of said tool carrier, and a tool on the tool-carrier, operatively connected with said pulley.

9. In a machine of the class described, the combination of a tool carrier supported for oscillation and automatically movable about its axis of oscillation, and a support for resisting the automatic movement of said tool carrier and movable to permit said automatic movement.

10. In a machine of the class described, the combination of a tool carrier supported for oscillation, automatically movable about its axis of oscillation and also movable transversely of its oscillatory movement, and a support for resisting the automatic movement of said tool carrier in the different transverse positions thereof and movable to permit said automatic movement.

11. In a machine of the class described, the combination of an oscillatory tool-carrier provided with a rotary tool, and a slide supporting said oscillatory tool-carrier between the axis of oscillation thereof and the axis of rotation of the tool.

12. In a machine of the class described, the combination of an oscillatory tool carrier, a support for said tool carrier to prevent normal movement of the tool carrier in a direction about its axis and movable to permit said motion, and an abutment between the support and the tool carrier swiveled to one of the parts.

13. In a machine of the class described, the combination of a reciprocatory work carrier, an oscillatory tool carrier provided with a tool adapted to longitudinally traverse the work on the reciprocation of the work carrier, automatically operable means for reciprocating the work carrier and at predetermined points shifting the work carrier laterally to cause the tool to move crosswise of the work, and means whereby the tool carrier can be moved about its axis.

14. In a machine of the class described, the combination of a reciprocatory work carrier, an oscillatory tool carrier provided with a tool adapted to longitudinally traverse the work on the reciprocation of the work carrier, automatically operable means for reciprocating the work carrier and for also moving the tool carrier laterally to cause the tool to move crosswise of the work, said tool carrier being automatically operable about its axis, and means for supporting the tool carrier in its different laterally adjusted positions and for also permitting advancing movement of said tool carrier about its axis of oscillation.

15. In a machine of the class described, the combination of an oscillatory, laterally-movable tool-carrier, and a movable support for said tool carrier, provided with a track, the tool carrier having an anti-friction roller swiveled thereto for engaging the track in the different lateral positions of said tool-carrier.

16. In a machine of the class described, the combination of an oscillatory tool-carrier, mechanism for automatically shifting said tool carrier step by step in the direction of its axis of oscillation, a movable support for the tool carrier, provided with means for sustaining said tool carrier in the different positions thereof, a rotary driven member on the tool carrier, a rotary driving member for said driven member supported independently of the tool carrier, the axis of oscillation of the tool carrier being between the centers of rotation of the driving and driven members, and a tool on the tool carrier operatively connected with said driven member.

17. In a machine of the class described, the combination of a reciprocatory work carrier, an oscillatory tool carrier, mechanism for automatically reciprocating the work carrier and for causing a sidewise movement of the tool carrier at the end of each stroke of the work carrier, and means for causing a movement of the tool carrier about its axis of oscillation to obtain reduction of the work.

18. In a machine of the class described, the combination of an oscillatory member movable in the direction of its axis of oscillation, a rotary feed screw and a nut on the feed screw, loosely connected with said oscillatory member to feed the latter in the direction of said axis on the rotation of the screw and to also permit shifting of the oscillatory member about said axis without moving the nut.

19. In a machine of the class described, the combination of an oscillatory member movable in the direction of its axis of oscillation, a rotary feed screw, and a nut on said feed screw, the nut being connected with and adapted to move said oscillatory member in the direction of said axis and to also permit swinging movement of the oscillatory member independently of the nut.

20. In a machine of the class described, the combination of an oscillatory member, mechanism for positively moving said member in the direction of its axis of oscillation, said member being adapted to swing independently of said mechanism.

21. In a machine of the class described, the combination of a work-carrier, an oscillatory tool-carrier movable also in the direction of its axis of oscillation, mechanism for moving said tool-carrier in the direction of its axis, said tool carrier being adapted to swing independently of said mechanism.

22. In a machine of the class described, the combination of an oscillatory, laterally-movable tool-carrier, a rotary feed screw, and a nut on the feed screw, the nut having a projection and the carrier having a slot to receive the projection to cause the nut to move the carrier laterally and to also permit swinging movement of the carrier independently of the nut.

23. In a machine of the class described, the combination of a shaft, a tool carrier supported for oscillation and lateral movements by said shaft, a rotary feed screw in the shaft, immovable in the direction of its axis of rotation, and a nut connected with and movable by the feed screw, said nut being connected with the carrier to move the same laterally on the rotation of the feed screw, and said connection being adapted to permit movement of the carrier independently of the nut, the shaft having an opening for the passage of the nut.

24. In a machine of the class described, the combination of a reciprocatory work-carrier, an oscillatory tool carrier provided with a rotary reducing tool to longitudinally traverse the work on the reciprocation of the carrier, mechanism for automatically moving said tool carrier sidewise approximately at the end of each stroke of the work carrier, and a movable support for upholding the tool carrier during its lateral movements.

25. In a machine of the class described, the combination of a reciprocatory work-carrier, an oscillatory tool-carrier provided with a reducing tool to longitudinally traverse the work on the movement of the work carrier, automatic means for moving the tool carrier laterally approximately at the conclusion of each stroke of the work carrier, a movable support against which the tool carrier rests and for sustaining said tool carrier throughout the entire range of its movement, and manually operable means for advancing said support.

26. In a machine of the class described, the combination of a work carrier, an oscillatory tool- arrier, provided with a reducing tool, a rotary driven member on the tool-carrier, operatively connected with the tool thereof, a driving member for said driven member, supported independently of the tool carrier, the axis of oscillation of the latter being between the centers of oscillation of the driving and driven members, a movable support for the tool carrier, and mechanism for intermittently moving the tool carrier laterally.

27. In a machine of the class described, the combination of a stationary shaft, a tool-carrier supported for oscillating and lateral movements by said shaft, a rotary feed screw in the shaft immovable in the direction of its axis of rotation, and a nut threaded on said feed screw, said stationary shaft having a slot and the nut having a projection, and a neck connecting said projection with the body of the nut, said neck being disposed within said slot and said oscillatory tool carrier having a slot to receive said projection whereby the nut will move the carrier sidewise and whereby said carrier can be swung on its axis of oscillation independently of the nut.

28. In a machine of the class described, the combination of a work carrier, a tool carrier mounted for movement toward and from the work and also transversely thereto, and mechanism for moving the tool carrier transversely, said tool carrier being movable independently of said mechanism toward and from the work.

29. In a machine of the class described, the combination of an oscillatory tool carrier, a ratchet wheel, a pawl for operating said ratchet wheel, a carrier for the pawl, mechanism for intermittently operating the tool carrier, and operative connections between said ratchet wheel and the tool carrier for moving the latter in the direction of its axis of oscillation.

30. In a machine of the class described, the combination of a work carrier, a ratchet wheel, a pawl carrier, a reversibly mounted pawl on said pawl carrier coöperative with said ratchet, operative connections between said ratchet and said work carrier, and means for intermittently oscillating said pawl carrier.

31. In a machine of the class described, the combination of an oscillatory tool carrier, a rotary member, automatic means for giving said rotary member intermittently one full turn, and means for transferring the effect of said member to said tool carrier, to move the same in the direction of its axis of oscillation.

32. In a machine of the class described, the combination of a reciprocatory work carrier, an oscillatory tool carrier movable in the direction of its axis of oscillation, a rotary member, means controlled by said work carrier for giving to said rotary member one full turn at the end of each stroke of the work carrier, and operative connections between said rotary member and the tool carrier for moving the latter in the direction of its axis of oscillation.

33. In a machine of the class described, the combination of an oscillatory tool carrier movable in the direction of its axis of rotation, a ratchet wheel, a pawl coöperative with said ratchet wheel, a carrier for the pawl, a reciprocatory member, a reciprocatory carriage, means connected with the work carrier for operating said reciprocatory member at the end of each stroke of the work carrier, means for transferring the effect of said reciprocatory member to said ratchet wheel to turn the same, and means actuated by said ratchet wheel for moving the tool carrier in the direction of its axis of movement.

34. In a machine of the class described, the combination of a reciprocatory work carrier, an oscillatory tool carrier, a ratchet wheel, a pawl coöperative with the ratchet wheel, a carrier for said pawl, a pinion rotative with the pawl carrier, a rack in mesh with said pinion, automatically operable means for intermittently reciprocating the rack at the end of each stroke of the work carrier, and means connected with said ratchet wheel for moving the tool carrier in the direction of its axis of movement on the rotation of said ratchet wheel.

35. In a machine of the class described, the combination of a reciprocatory work carrier, an oscillatory tool carrier, a one-revolution clutch, one of the members of which is normally continuously operative and the other member of which is normally inoperative, mechanism connected with the reciprocatory carrier for putting the normally inoperative member of the clutch into working relation with the normally operative member thereof, to thereby rotate said normally inoperative clutch member, and means connected with said normally inoperative clutch member when the same is rotated for moving the tool carrier in the direction of its axis of oscillation.

36. In a machine of the class described, the combination of a reciprocatory work carrier, a rotary member, a continuously rotative ratchet wheel, a pawl supported by said rotary member and normally out of engagement with said ratchet wheel, means controlled by the work carrier for causing the pawl to engage said ratchet wheel to thereby rotate said rotary member, an oscillatory work carrier, and means connected with said rotary member for laterally moving said work carrier.

37. In a machine of the class described, the combination of a reciprocatory work carrier, a reciprocatory tripping device, means connected with said work carrier for effecting the reciprocation of said tripping device approximately at the end of each stroke of the work carrier, a continuously rotative ratchet wheel, a rotary member, a pawl coöperative with said ratchet wheel, on said rotary member, means tending to constantly move said pawl into engagement with the ratchet wheel, a latch engaging said pawl to prevent said engagement, means connected with said trip device for tripping said latch on each movement of the trip device, a tool carrier movable toward and from the work carrier, and means operative by said rotary member for moving said work carrier in a direction transverse to its other movement.

In testimony whereof I affix my signature in presence of two witnesses.

BENGT M. W. HANSON.

Witnesses:
W. M. STORRS,
C. M. GELLERT.